Oct. 29, 1929.  R. W. HERBER  1,733,408
WINDSHIELD ATTACHMENT
Filed March 23, 1928  2 Sheets-Sheet 2
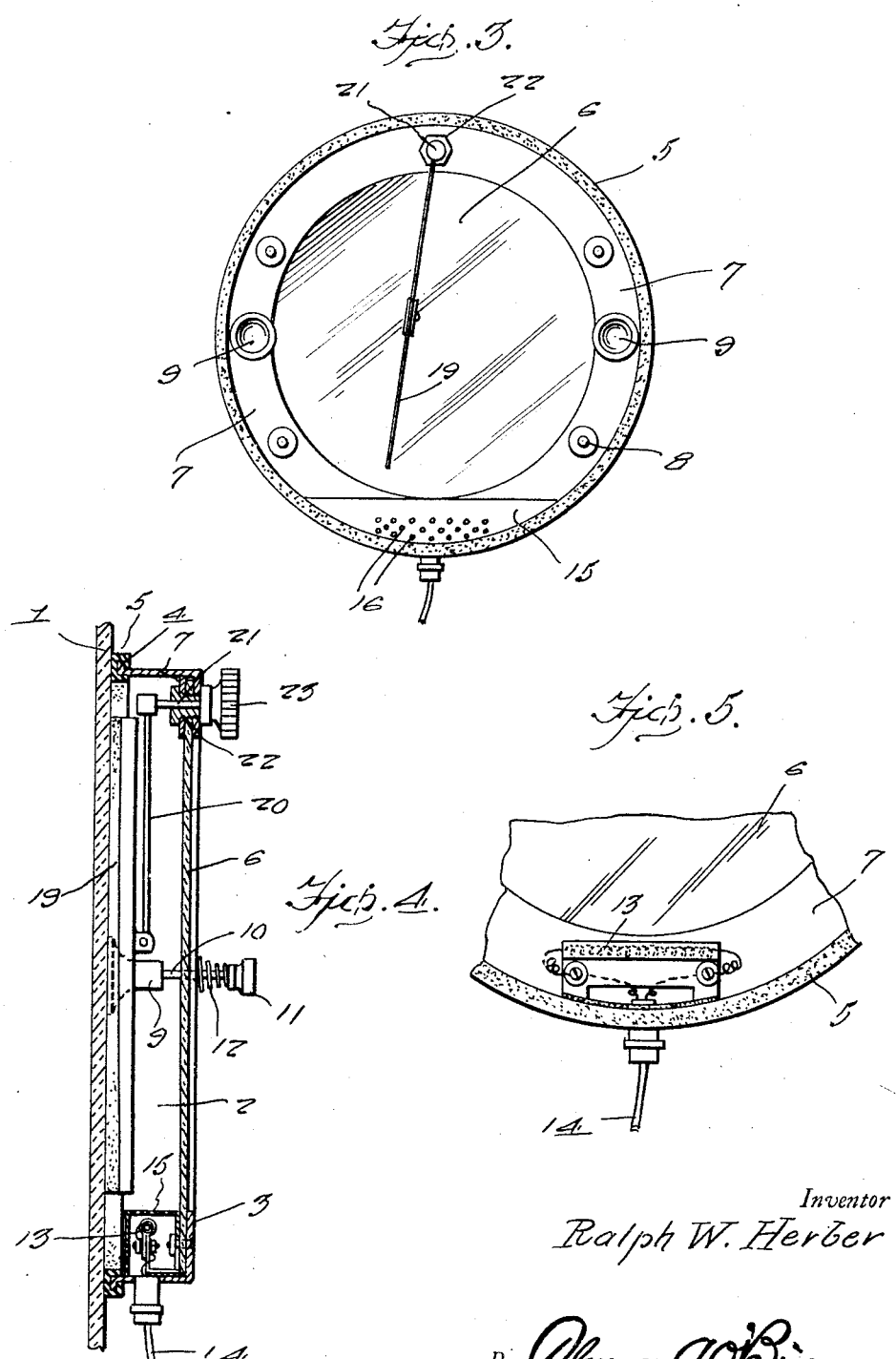

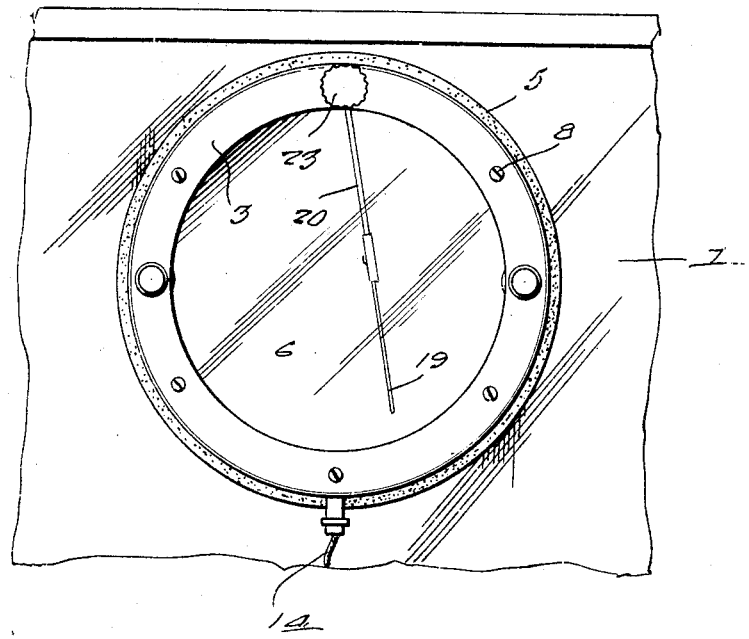
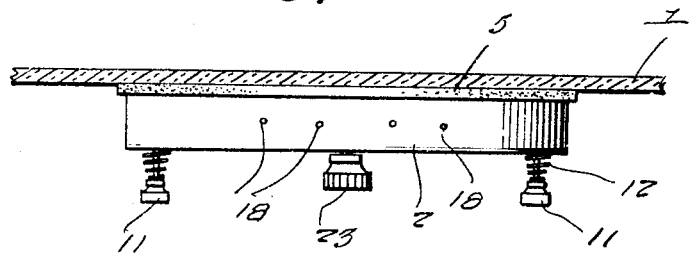
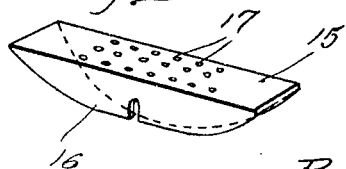

Patented Oct. 29, 1929

1,733,408

UNITED STATES PATENT OFFICE

RALPH W. HERBER, OF PONTIAC, MICHIGAN

WINDSHIELD ATTACHMENT

Application filed March 23, 1928. Serial No. 264,128.

The present invention relates to improvements in attachments for windshields and has for its principal object to provide a device for disposition against the inside of the windshield panel directly in front of the driver for the purpose of preventing the formation of snow or sleet on the windshield whereby the vision of the operator of the automobile will not be impaired.

Another important object of the invention is to provide a windshield attachment that includes a means for heating a portion of the windshield in front of the driver so that the usual windshield wiper will be free to operate, an additional windshield wiper being arranged for engagement with the inner face of the glass panel of the windshield to prevent the formation of moisture on the windshield panel.

A still further object is to provide a windshield attachment of the above mentioned character that can be readily and easily installed for use when driving in cold weather, the device being readily removable whenever desired.

A further object is to provide a windshield attachment of the above mentioned character which is simple in construction, inexpensive, strong and durable and further well adapted to the purpose for which it is designed.

Other objects and advantages of the invention will become apparent during the course of the following description when taken in connection with the accompanying drawings.

In the accompanying drawings wherein like reference characters indicate corresponding parts throughout the several views:

Figure 1 is a rear elevation of the attachment embodying my invention showing the same mounted on the inner face of the windshield glass panel.

Figure 2 is a top plan view of the attachment showing the manner in which the same engages with the rear face of the glass panel of the windshield.

Figure 3 is a front elevation of the device.

Figure 4 is a vertical sectional view through the attachment and the adjacent portion of the glass panel of the windshield.

Figure 5 is a fragmentary detail view showing the heating element forming a part of the present invention, and Figure 6 is a detail perspective view of the perforated shield provided for the heating unit.

In the drawings wherein for the purpose of illustration is shown the preferred embodiment of my invention, the numeral 1 designates the glass panel of an automobile windshield. The device embodying my invention which is detachably mounted on the rear face of the glass panel comprises a circular frame 2, the rear edge of the frame being formed with an inwardly directed annular flange 3, while the forward edge of the frame may be rolled or formed with a flange 4 for the purpose of receiving the rubber cushioning ring 5 as clearly shown in Figure 4. The channel shaped rubber cushioning ring 5 is adapted to fit against the rear face of the glass panel 1 of the windshield.

A circular transparency 6 is arranged within the frame 2, the rear face of the perimeter of this transparency engaging with the inner face of the inwardly directed flange 3. A ring 7 is also arranged within the frame 2 for disposition against the front face of the circular transparency 6 and any appropriate fastening means such as is shown at 8 extends through the flange 3 and through the ring 7 as well as through the peripheral edge portion of the transparency 6 for securing the latter in a rigid position in the rear portion of the frame.

The frame 2 as well as the ring 7 is preferably constructed of aluminum, and while I have shown the same as being of circular formation, it is to be understood that any other shape may be employed and I do not wish to be limited to any particular shape or material.

For the purpose of securing the attachment on the glass panel 1 of the windshield, I provide the suction cups 9 that are secured on the inner ends of slidable plunger rods 10 that extend through the rear side of the frame at diametrically opposite points, the outer ends of these rods having arranged thereon suitable knobs 11. Coil springs 12 encircle the outer ends of the plunger rods and are disposed between the flange 3 and the respective knobs as clearly shown in the drawings.

In attaching the device to the rear face of the glass panel 1, the suction cups 9 are slightly moistened after which the device is properly positioned on the glass panel so as to be directly in the line of vision of the operator of the vehicle, the knobs 11 are then pressed or pushed inwardly whereby the suction cups will properly grip the glass panel 1 and secure a positive hold on the glass after which the pressure on the knobs is released and the springs will urge the plunger rods outwardly. In this manner the device is properly supported on the windshield glass panel, and the rubber cushioning member 5 will fit against the glass panel.

Arranged within the bottom portion of the frame 2 is an electric heating unit designated generally by the numeral 13, the same being insulated with respect to the metallic frame and current is supplied to the unit by the wiring 14 which has communication with a suitable plug (not shown) that engages into a socket (not shown) mounted on the automobile and the current to the socket is supplied by the storage battery.

A protector shield 15 is removably arranged over the heating unit 13 within the frame and the shield is formed with cold air inlet openings 16 in the lower portion of one side thereof, while hot air outlet openings 17 are formed in the top of the shield.

The top of the frame 2 may be provided with air vents such as are shown at 18 with reference more particularly to Figure 2.

The purpose of the shield 15 is to prevent direct heating of the windshield and more particuuarly to obtain better circulation of the air within the space formed between the transparency 6 and the glass panel 1 of the windshield.

The current to the heating unit 13 is only turned on when the operator of the automobile is about to drive through a sleet, or snow storm, and when the current is on, the temperature in the space between the glass panel 1 of the windshield and the transparency 6 will increase and the warm air will prevent the formation of ice or sleet or wet snow on the outside of the windshield directly in front of the driver, thus permitting the usual windshield wiper (not shown) to properly function in keeping this portion or area of the windshield glass panel clear, so that the vision of the operator through the windshield panel will not be obstructed.

In order to prevent the formation of condensation on the rear face of the windshield panel 1, I have provided a wiper arm 19 that is carried by a rod 20, the upper end of this rod being operatively connected to the stub shaft 21 that is journaled for rotation within a suitable bushing 22 provided therefor in the top of the rear portion of the frame, and an actuating knob 23 is secured on the outer end of this stub shaft for manually actuating the stub shaft whereby to move the wiper arm 19 across the rear face of the windshield glass panel 1 at occasional intervals.

The provision of a windshield attachment of the above mentioned character will insure a clear vision being obtained by the driver of the automobile through the windshield glass panel while driving through a sleet or snow storm and due to its simplicity, the device will at all times be positive and efficient in its operation. Furthermore the device is of such construction as to permit the same to be readily and easily attached or removed.

While I have shown the preferred embodiment of my invention, it is to be understood that minor changes may be made in the size, shape and arrangement of parts without departing from the spirit of the invention and the scope of the appended claims.

While I have shown the preferred embodiment of my invention, what I claim is:

1. In an attachment for windshields, a frame, an inwardly directed flange at the rear end of the frame, a twisting member on the forward end of the frame for disposition against the rear face of the windshield, a transparency arranged within the frame for disposition against said flange, a ring within the frame for engagement against the front face of the transparency, securing means extending through the flange, rings on said transparency, spring pressed plunger rods slidable through the flange, suction cups carried by the forward ends of the rods for engagement with the rear face of the panel to secure and support the same against the panel, operating knobs on the outer rear ends of the rods, a heating unit arranged within the frame, a protector shield arranged over the heating unit and formed with hot air outlet openings, the frame being formed with air vents in the top portion thereof, and a cold air inlet opening formed in the bottom of the protector shield.

2. In an attachment for windshields, a frame, a transparency supported in the rear portion of the frame, means for securing the forward portion of the frame against the rear face of the windshield, a heating unit arranged within the frame, a protector unit arranged over the heating unit and formed with hot air outlet openings, the frame being formed with air vents in the top portion thereof, a cold air inlet formed on the bottom of the said protector shield, and means arranged within the frame for preventing the collection of condensation on the rear face of the adjacent area of the windshield.

In testimony whereof I affix my signature.

RALPH W. HERBER.